United States Patent
Pezzotta et al.

(10) Patent No.: US 10,871,225 B2
(45) Date of Patent: Dec. 22, 2020

(54) ELECTROMECHANICAL, ACTIVE DUAL-REDUNDANCY, TWIN-MOTOR ACTUATOR TO OPERATE A COMPONENT OF A VEHICLE

(71) Applicant: MARELLI EUROPE S.p.A., Corbetta (IT)

(72) Inventors: Federico Pezzotta, Montenero di Bisaccia (IT); Stefano Musolesi, San Giovanni in Persiceto (IT); Michele Garofalo, Campobasso (IT)

(73) Assignee: MARELLI EUROPE S.p.A., Corbetta (IT)

( * ) Notice: Subject to any disclaimer, the term of this patent is extended or adjusted under 35 U.S.C. 154(b) by 41 days.

(21) Appl. No.: 16/150,493

(22) Filed: Oct. 3, 2018

(65) Prior Publication Data

US 2019/0107197 A1  Apr. 11, 2019

(30) Foreign Application Priority Data

Oct. 6, 2017  (IT) .......................... 102017000112581

(51) Int. Cl.
*F16H 63/34* (2006.01)
*F16H 61/12* (2010.01)
(Continued)

(52) U.S. Cl.
CPC .......... *F16H 63/3466* (2013.01); *B60T 1/005* (2013.01); *B60T 1/062* (2013.01);
(Continued)

(58) Field of Classification Search
None
See application file for complete search history.

(56) References Cited

U.S. PATENT DOCUMENTS 8,839,937 B2 * 9/2014 Hazama ................. B60T 1/005
  192/219.5
9,771,989 B2 * 9/2017 Iwata ..................... B60T 1/005
(Continued)

FOREIGN PATENT DOCUMENTS

| CN | 101559766 A | 10/2009 |
| CN | 204627210 U | 9/2015 |
| JP | H02273051 A | 11/1990 |

OTHER PUBLICATIONS

Communication dated Feb. 4, 2019 transmitting the Extended European Search Report dated Jan. 24, 2019 for European Patent Application No. 18198076.4.
(Continued)

*Primary Examiner* — Colby M Hansen
(74) *Attorney, Agent, or Firm* — Howard & Howard Attorneys PLLC

(57) ABSTRACT

Electromechanical actuator to operate a component of a vehicle provided with a housing formed by a lower element and a lid; a transmission arranged inside the housing and comprising an output shaft provided with a first symmetry axis and an intermediate shaft, which meshes with the output shaft and is provided with a second symmetry axis transverse to the first symmetry axis; and a pair of electric motors also arranged inside the housing; wherein each of the two electric motors rotates the output shaft through the intermediate shaft and wherein the two electric motors are provided with respective rotation axes parallel to each other and transverse to the first symmetry axis.

10 Claims, 4 Drawing Sheets

(51) Int. Cl.
    *F16H 61/32*     (2006.01)
    *F16D 65/14*     (2006.01)
    *B60T 1/06*     (2006.01)
    *B60T 13/74*     (2006.01)
    *H02K 7/116*     (2006.01)
    *B60T 1/00*     (2006.01)
    *F16D 127/06*     (2012.01)
    *F16D 125/64*     (2012.01)
    *F16D 121/24*     (2012.01)
    *F16D 125/48*     (2012.01)
    *F16D 66/00*     (2006.01)
    *F16D 125/52*     (2012.01)
    *F16D 65/00*     (2006.01)

(52) U.S. Cl.
CPC ............ B60T 13/746 (2013.01); F16D 65/14 (2013.01); F16H 61/12 (2013.01); F16H 61/32 (2013.01); H02K 7/1166 (2013.01); *F16D 65/0006* (2013.01); *F16D 2066/003* (2013.01); *F16D 2121/24* (2013.01); *F16D 2125/48* (2013.01); *F16D 2125/52* (2013.01); *F16D 2125/64* (2013.01); *F16D 2127/06* (2013.01); *F16H 2061/122* (2013.01); *F16H 2061/1288* (2013.01); *H02K 2213/06* (2013.01)

(56) References Cited

U.S. PATENT DOCUMENTS

| | | |
|---|---|---|
| 2004/0254040 A1 | 12/2004 | Somschor et al. |
| 2005/0184265 A1 | 8/2005 | Aoki et al. |
| 2006/0181166 A1* | 8/2006 | Saito ..................... H02K 11/38 310/75 R |
| 2009/0078898 A1 | 3/2009 | Sasaki et al. |
| 2014/0021808 A1 | 1/2014 | Palfenier et al. |
| 2018/0216676 A1* | 8/2018 | Geiser ................... F16D 41/067 |
| 2018/0231071 A1* | 8/2018 | Geiser ................... F16D 41/088 |

OTHER PUBLICATIONS

Search Report dated Jun. 25, 2018 for Italian Patent Application No. 201700112581.

* cited by examiner

ELECTROMECHANICAL, ACTIVE DUAL-REDUNDANCY, TWIN-MOTOR ACTUATOR TO OPERATE A COMPONENT OF A VEHICLE

CROSS-REFERENCE TO RELATED APPLICATIONS

This application claims priority from Italian Patent Application No. 102017000112581 filed on Oct. 6, 2017, the disclosure of which is incorporated by reference.

TECHNICAL FIELD

The present invention relates to an electromechanical, active dual-redundancy, twin-motor actuator to operate a component of a vehicle, in particular for a park lock mechanism in the parking function of an automated gearbox and/or for a parking brake.

PRIOR ART

As already known, various components of a vehicle, such as e.g. the locking mechanism that is operated in the parking function of an automated gearbox and/or the parking brake, are operated by actuators. Until a few years ago, the actuators used to operate the components of an internal combustion engine and/or of a vehicle were pneumatic, while in recent years electromechanical actuators have been introduced.

The known electromechanical actuators may be subjected to distortions to the actuator housing due to the applied mechanical stresses. In particular, the increasingly stringent requirements, in particular with regard to compactness, reduced size, weight and costs, imply a thickness reduction or the use of a lower density or less expensive material. Moreover, also reliability requirements are increasingly stringent to avoid any failure or malfunction of the electromechanical actuator that could prevent a proper functioning of the component.

In fact, dual-redundancy actuators are required on the parts that are most prone to failures (e.g. electric motors) of systems performing functions that are relevant to passenger safety.

For example, CN101559766 describes an electromechanical actuator to operate a component of an internal combustion engine and/or of a vehicle comprising a transmission provided with a first shaft having a first symmetry axis and a second shaft, which meshes with the first shaft and having a second symmetry axis transverse to the first symmetry axis; and a pair of redundant electric motors, wherein each of the two electric motors rotates (directly or by means of gears) the first shaft through the second shaft and wherein the two electric motors are provided with respective rotation axes parallel to each other and transverse to the first symmetry axis. The solution described in CN101559766, however, is not very compact and requires the construction of two worm-screw shafts.

Description of the Invention

The object of the present invention is therefore to provide an electromechanical, active dual-redundancy, twin-motor actuator to operate a component of a vehicle (in particular for a park lock mechanism in the parking function of an automated gearbox or to operate a parking brake), which is free of the drawbacks of the state of the art, is easy and inexpensive to manufacture and is provided with the active dual-redundancy on the electric power part and with a kinematic mechanism that ensures the irreversibility of the motion during operation.

In accordance with the present invention, an electromechanical, active dual-redundancy, twin-motor actuator is provided to operate a component of a vehicle, in particular to operate a park lock mechanism in an automated gearbox and/or a parking brake, as claimed by the appended claims.

BRIEF DESCRIPTION OF THE DRAWINGS

The present invention will now be described with reference to the accompanying drawings showing an example of non-limiting embodiment, in which.

PREFERRED EMBODIMENTS OF THE INVENTION

Figure 1:
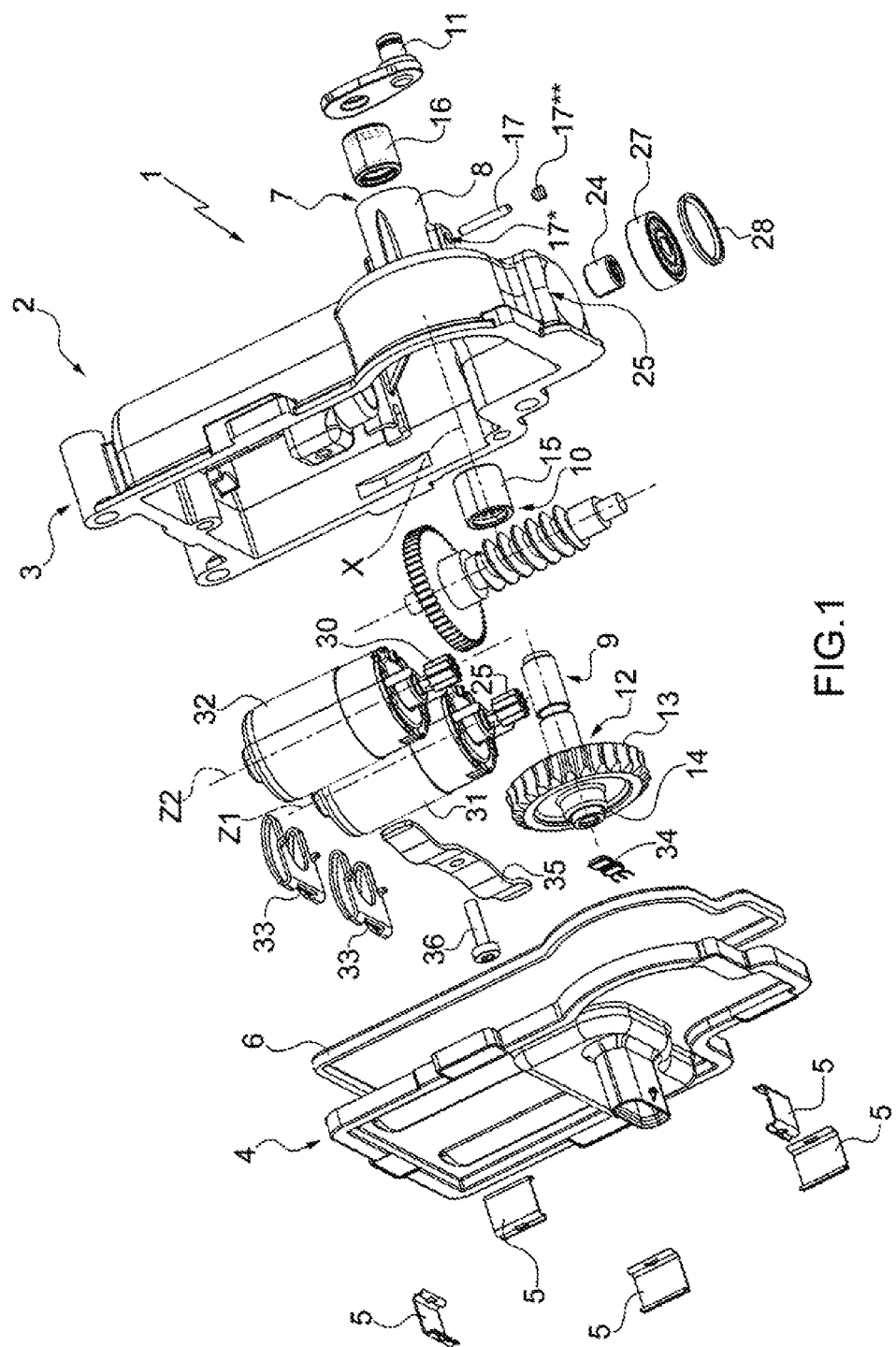
FIG. 1 is an exploded view of an electromechanical actuator to operate a component made in accordance with the present invention.
Figure 2:
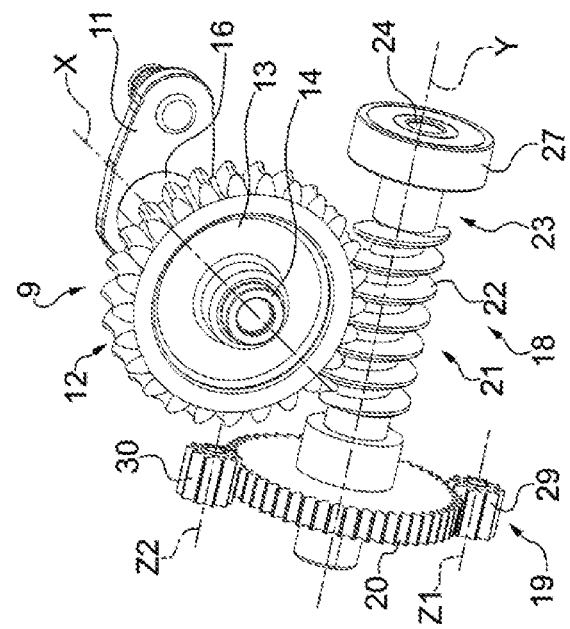
FIG. 2 is a view of a transmission system of the electromechanical actuator of FIG. 1.

FIGS. 1 to 7 show in detail an electromechanical actuator 1. The electromechanical actuator 1 is preferably configured to control a park lock mechanism, i.e. a locking leverism, which is operated in the parking function of an automated gearbox. Alternatively, the electromechanical actuator 1 can control any one of the components of a vehicle or of an electric, hybrid or internal combustion engine such as, for example, an electric parking brake, a butterfly valve, an EGR solenoid valve for regulating the flow rate of the exhaust gases flowing through an EGR circuit and any devices accompanying a turbocharger (such as e.g. blades and/or valves).

The electromechanical actuator 1 comprises a housing 2 formed by a lower element 3 and by a lid 4, which are suitably connected to each other by a plurality of closing clips 5 arranged on the periphery of the housing 2, and internally defining a compartment V. The seal between the lower element 3 and the lid 4 is ensured by a (single or double) annular lip seal 6 housed in a groove formed in the lid 4.

A seat 7 is formed inside the compartment V, said seat being provided with a symmetry axis X, defined by a substantially cylindrical side wall 8, which cantileverly projects from the lower element 3 towards the outside of the housing 2. The seat 7 is designed to house a portion of a metal output shaft 9 coaxial with the symmetry axis X. Preferably, the output shaft 9 has a diameter of about 10 millimetres. An output end 10 of the output shaft 9 engages the seat 7 from which it protrudes through a through opening, coaxial to the symmetry axis X, to be coupled with an interface lever 11 operating the component user device. Alternatively, the component user device can be operated by any geometry obtained directly on the output shaft 9, in particular on the output end 10. When the operation of the component user device takes place through the interface lever 11, it is actuated by the output end 10 to which it is integral. The connection between the interface lever 11 and the output end 10 can be achieved by any type of connection, preferably by welding (in particular by laser welding).

A coupling end 12 of the output shaft 9, opposite the output end 10, is connected to a toothed wheel 13. The toothed wheel 13 is alternatively made of plastic material or of metallic material. Preferably, the toothed wheel 13 is obtained by means of an injection moulding or sintering process with the output shaft 9.

The coupling end 12 is further provided with a magnet 14 formed as an upper portion or appendage having an annular shape, coaxial to the symmetry axis X and made of a magnetic material, which in use faces the lid 4. The magnet 14 is preferably made of plasto-neodymium. The magnet 14 is preferably made through a co-moulding process on the output shaft 9.

Moreover, two needle roller bearings, indicated respectively with 15 and 16, are fitted on the output shaft 9 to lock the output shaft 9 in a radial direction. In particular, the two needle roller bearings 15, 16 are interlocked in the seat 7. Between the two needle roller bearings 15, 16, a plug 17 is interposed to lock the output shaft 9 in the axial direction.

The plug 17 engages a seat 17\* formed in the lower element 3 and closed through a plug **17\*\***.

Alternatively, a sealing ring or circlip is interposed between the two needle roller bearings 15, 16 in axial direction between the two roller bearings 15, 16.

The compartment V further houses an intermediate transmission shaft 18. The intermediate transmission shaft 18 is preferably made of metallic material. The intermediate transmission shaft 18 is provided with a symmetry axis Y, transverse (preferably orthogonal) to the symmetry axis X. Preferably, the intermediate transmission shaft 18 has a diameter of about 6 millimetres. An inner end 19 of the intermediate transmission shaft 18 is connected to a toothed cylindrical wheel 20 with straight teeth. The toothed wheel 20 is preferably made of plastic material. Preferably, the toothed wheel 20 is made through an injection co-moulding process of the intermediate transmission shaft 18. A central portion 21 of the intermediate transmission shaft 18, on the other hand, is provided by a worm-screw wheel 22. The central portion 21 is intended, in use, to mesh with the toothed wheel 13 with helical teeth.

Moreover, at an outer end 23, opposite the inner end 19, of the intermediate transmission shaft 18, a needle roller bearing 24 is fitted to lock the intermediate transmission shaft 18 in a radial direction and to support it on the inner end.

Finally, a ball thrust bearing 27 is keyed to lock the intermediate transmission shaft 18 in the radial/axial direction and to support it on the outer end. Finally, the thrust bearing 27 engages a seat 25 formed in a side wall 26 of the lower element 3, which is closed through a plug 28.

The axial clearance is made between the two stops of the intermediate shaft 18 and the two bearings 24, 27. Alternatively, the axial clearance can be made by X-mounting two oblique needle roller bearings (with a clearance adjustment on the outside) or by means of an elastic plug.

The toothed cylindrical wheel 20 with straight teeth is designed to mesh with the respective pinions 29, 30 of a pair of electric motors 31, 32. The electromechanical actuator 1 is in fact operated by the pair of electric motors 31, 32 arranged (in particular, snap-locked) inside respective housings formed in the lower element 3. In particular, the two electric motors 31, 32 are provided with respective, mutually parallel rotation axes $Z_1$, $Z_2$. The rotation axes $Z_1$, $Z_2$ are preferably parallel to the symmetry axis Y. Furthermore, the rotation axes $Z_1$, $Z_2$ are substantially transverse (preferably orthogonal) to the symmetry axis X. The two electric motors 31, 32 are substantially identical to each other. The two electric motors 31, 32 are provided, at one of their axial ends, with respective pinions 29, 30 designed to transmit motion from the corresponding electric motor 31, 32 to the same end of the intermediate transmission shaft 18.

The two electric motors 31, 32 are arranged side by side. The two pinions 29, 30 are arranged in use on opposite sides with respect to the toothed wheel 20 with which they engage.

The intermediate transmission shaft 18 does not coincide with the output shaft of the two electric motors 31, 32.

This technical solution allows obtaining an extremely compact layout. This technical solution further allows avoiding the manufacture of two worm-screw shafts. At one of their axial ends, opposite the axial end provided with the respective pinion 29, 30, both electric motors 31, 32 are connected to a respective axial spring 33. Each spring 33 is designed to dampen the vibrations produced by the rotation of the respective electric motor 31, 32. Both electric motors 31, 32 are provided with a further radial spring 35, which surrounds the stator casing of each electric motor 31, 32 and is constrained to the frame 3 by means of a screw 36.

The electromechanical actuator 1 is further provided with a sensor 34 facing and close to the toothed wheel 13 with helical teeth so as to detect the rotary motion of the output shaft 9 about the symmetry axis X. The sensor 34 is integral to an inner surface of the lid 4.

The sensor 34 is fixed in a position directly facing the magnet 14. The sensor 34 is configured to detect the motion of the magnet 14 about the symmetry axis X. The arrangement of the sensor 34 facing the magnet 14 allows obtaining a radial reading of the position of the magnet 14.

The motion is transmitted from the electric motors 31, 32 to the output shaft 9 through a suitable transmission. The transmission can be alternatively manufactured by means of different solutions, which provide e.g. the use of belts, etc. In the preferred embodiment, the motion transmission occurs through the intermediate transmission shaft 18 that, through the toothed wheel 20, receives the motion from the pinions 29 and 30 of the electric motors 31, 32 and through the helical screw wheel 22 meshes with the toothed wheel 13 with helical teeth integral to the output shaft 9.

Coatings that reduce friction and/or suitable surface treatments can be provided in order to avoid the occurrence of problems of a tribological nature (such as friction and wear). To obtain a good compromise between the requirements of mechanical strength, thermal resistance, weight and costs, in the preferred embodiment the lower element 3 is made of a metallic material, preferably aluminium; the lid 4 is instead preferably made of plastic material.

Figure 3:
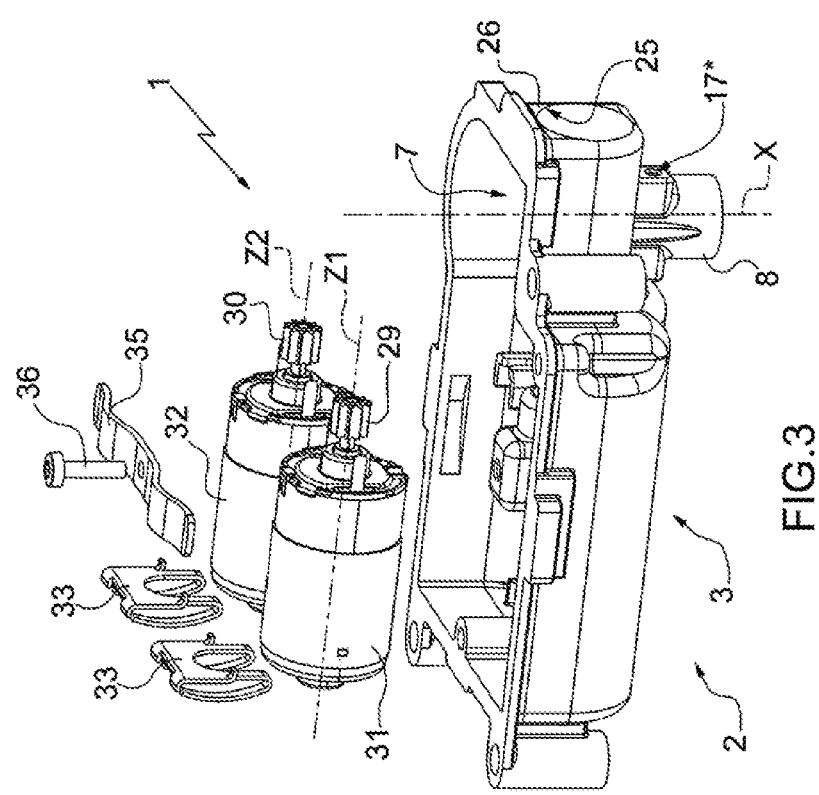
FIGS. 3 to 5 sequentially show the assembling steps of the electromechanical actuator of FIG. 1.
Figure 4:
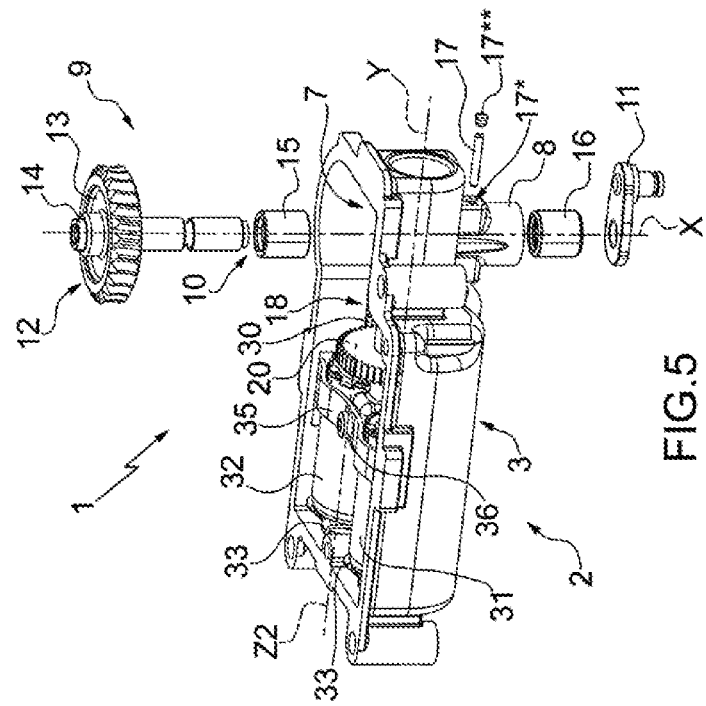
Figure 5:
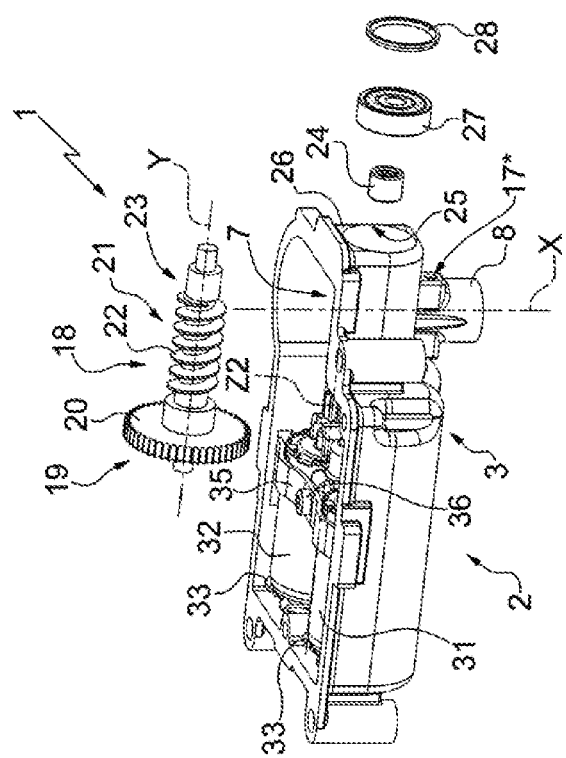
Figure 7:
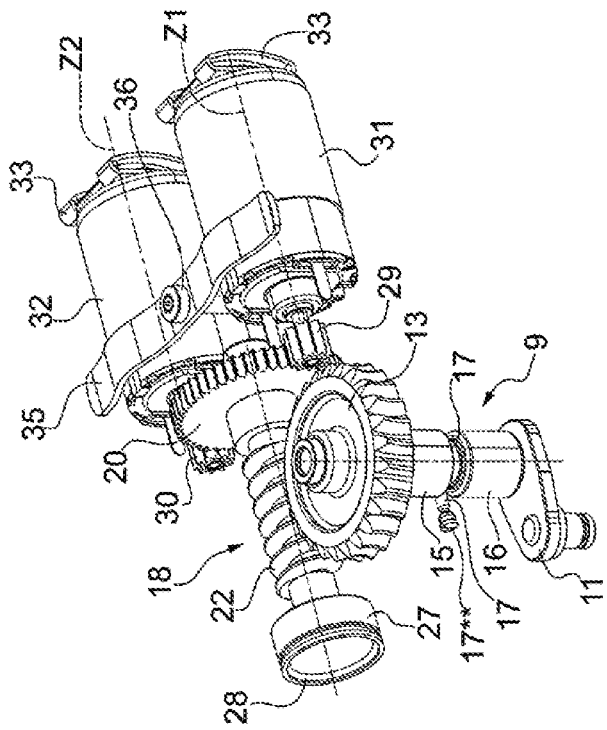
FIG. 7 is a perspective view with parts removed for clarity's sake of the electromechanical actuator of FIG. 1.
Figure 6:
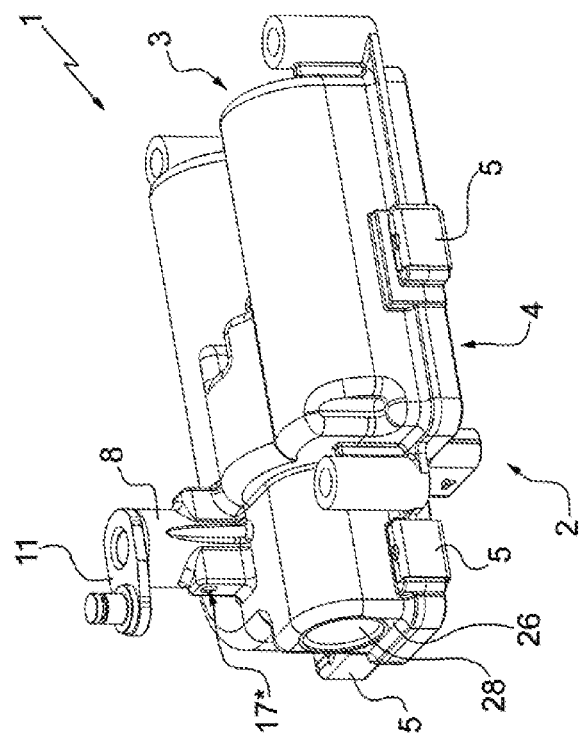
FIG. 6 is a view of the fully assembled electromechanical actuator of FIG. 1.

According to what successively shown in FIGS. 3 to 5, the assembling process of the electromechanical actuator 1 initially provides arranging (in particular, snap-fitting) the two electric motors 31, 32 inside the respective housings formed in the lower element 3 and locking them by means of the radial spring 35 and of the screw 36. Then, the intermediate transmission shaft 18 is inserted so that the toothed wheel 20 meshes with the pinions 29, 30 and so that the outer end 23 engages the needle roller bearing 24, the thrust bearing 27 is fitted and the plug 28 is inserted. Subsequently, the two needle roller bearings, indicated respectively with 15 and 16, and the sealing ring 17 are fitted on the output shaft 9, the outlet shaft 9 is inserted into the seat 7 so that the toothed wheel 13 with helical teeth meshes with the worm-screw helical wheel 22 and the output shaft 9 is connected to the interface lever 11. Finally, once the sensor 34 is connected to the lid 4, the housing 2 is closed through the closing clips 5 made for tightening the lower element 3 to the lid 4.

The aforesaid described electromechanical actuator 1 has a plurality of advantages. In particular, it is easy and inexpensive to manufacture, has a limited size, is compact and is characterized by a high mechanical and thermal stress resistance of the various components. Moreover, the presence of two electric motors 31, 32, which mesh with the intermediate transmission shaft 18, allows a safe operation of the electromechanical actuator 1 even in the event of an electrical failure in any of the two electric motors 31, 32. The two electric motors 31, 32, in fact, are designed to operate in parallel, but should a failure occur in any of said electric motors 31, 32, the other electric motor 31, 32 not affected by the failure would be able to transmit the motion to the output shaft 9 for a limited period. A further advantage of the electromechanical actuator 1 described above relates to the irreversibility of the motion during operation, obtained through the use of an irreversible coupling between the worm-screw helical wheel 22 and the toothed wheel 13 with helical teeth integral to the output shaft 9.

The invention claimed is:

1. An electromechanical actuator (1) to operate a component of an internal combustion engine and/or of a vehicle comprising:
    a housing (2), which is obtained through a lower element (3) and a lid (4);
    a transmission, which is arranged inside the housing (2) and comprises an output shaft (9), which is provided with a first symmetry axis (X), and an intermediate shaft (18), which meshes with the output shaft (9) and is provided with a second symmetry axis (Y), which is transverse to the first symmetry axis (X); and
    a pair of electric motors (31, 32), which are also arranged inside the housing (2); wherein each one of the two electric motors (31, 32) causes the rotation of the output shaft (9) through the intermediate shaft (18), and wherein the two electric motors (31, 32) are provided with respective rotation axes ($Z_1$, $Z_2$), which are parallel to one another and transverse to the first symmetry axis (X);
    wherein the two electric motors (31, 32) are arranged side by side and are provided, at one of their axial ends, with respective gears (29, 30) arranged on opposite sides of a common toothed wheel (20) of the intermediate shaft (18) with which they mesh so that the gears (29, 30) transmit the motion from the corresponding electric motor (31, 32) to the same end of the intermediate shaft (18); and
    wherein at least one needle roller bearing is fitted on the output shaft (9) so as to lock the output shaft (9) in a radial direction and a plug (17) is placed to lock the output shaft (9) in an axial direction.

2. An actuator according to claim 1, wherein the rotation axes ($Z_1$, $Z_2$) are parallel to the second symmetry axis (Y).

3. An actuator according to claim 1, wherein, at one of their axial ends, opposite the axial end provided with the respective gear (29, 30), both electric motors (31, 32) are connected to a respective first axial spring (33) designed to dampen the vibrations produced by the rotation of the respective electric motor (31, 32).

4. An actuator according to claim 3, wherein both electric motors (31, 32) are connected to a respective second radial spring (35), which is constrained by means of fixing means (36) and surrounds a stator casing of the electric motors (31, 32).

5. An actuator according to claim 1, wherein the intermediate shaft (18) is provided with a worm-screw helical wheel (22), which, in use, meshes with a toothed wheel (13) with helical teeth of the output shaft (9).

6. An actuator according to claim 1, wherein the output shaft (9) is provided, at its first end, with a magnet (14) obtained as an upper portion or appendage, having an annular shape, coaxial to the first symmetry axis (X) and made of a magnetic material, which, in use, faces the lid (4).

7. An actuator according to claim 6, wherein the magnet (14) and the toothed wheel (13) with helical teeth are arranged at the first coupling end (12), opposite a second output end (10) of the output shaft (9) connected to an interface lever (11) for the operation of the component.

8. An actuator according to claim 1, wherein two bearings (15, 16), preferably two needle roller bearings, are fitted on the output shaft (9) and a plug (17) or a sealing ring is interposed between the two bearings (15, 16) so as to lock the output shaft (9) in an axial direction.

9. An actuator according to claim 1 and comprising at least one sensor (34), which is caused to be integral to an inner surface of the lid (4) in a position facing and close to the output shaft (9), so as to detect the rotary motion of the output shaft (9) around the first symmetry axis (X).

10. An actuator according to claim 1, wherein the housing (2) is obtained through a lower element (3) and a lid (4), which are suitably connected to each other by a plurality of closing clips (5) arranged on the periphery of the housing (2), and define internally a compartment (V); wherein both the electric motors (31, 32) are arranged inside the housing (2); and in that, inside the compartment (V), a seat (7) is formed coaxial to the first symmetry axis (X) and defined by a substantially cylindrical side wall (8), which cantileverly projects from the lower element (3) towards the outside of the housing (2) and is designed to house a portion of the output shaft (9).

* * * * *